July 10, 1962 E. F. HARTER 3,043,115
METHOD AND APPARATUS FOR THE GENERATION OF ELECTRIC POWER
Filed Dec. 30, 1959 2 Sheets-Sheet 1

INVENTOR.
EARL F. HARTER
BY Herman Seid
ATTORNEY.

July 10, 1962 E. F. HARTER 3,043,115
METHOD AND APPARATUS FOR THE GENERATION OF ELECTRIC POWER
Filed Dec. 30, 1959 2 Sheets-Sheet 2

INVENTOR.
EARL F. HARTER
BY Herman Seid
ATTORNEY.

3,043,115
METHOD AND APPARATUS FOR THE GENERATION OF ELECTRIC POWER
Earl F. Harter, Murrysville, Pa., assignor to Carrier Corporation, Syracuse, N.Y., a corporation of Delaware
Filed Dec. 30, 1959, Ser. No. 862,985
9 Claims. (Cl. 62—236)

This invention relates to a method and apparatus for the generation of electric power and more particularly, to electric power generation systems employing capacitance circuits for the self-excitation of an induction generator. In particular, this invention relates to a dynamo unit adapted for use in a transportation refrigeration system wherein the unit may be employed either as a motor for driving a refrigeration compressor or as a generator to supply electric power to the refrigeration controls and fans which are generally associated with such systems.

In refrigeration systems, especially those adapted for use in the transportation field, it is customary to provide a prime mover or other mechanical power source which drives the compressor of the system and an electrical power generator. The power source may be either a power takeoff on the vehicle engine, a power takeoff on the axle of the vehicle or a separate auxiliary internal combustion engine. However, with such systems, it frequently happens that the vehicle is required to remain in a garage or railroad siding where the prime mover is either not in operation or where use of the prime mover is undesirable or prohibited because of noise and noxious exhaust which is incident to its use. If the cargo storage space of the vehicle is to remain at the desired temperature, it is then necessary to provide some auxiliary means for operating the refrigeration compressor. Under such circumstances an auxiliary source of electric power is generally available and one solution to the problem is the provision of an electric motor deriving its power from available electric lines to drive the refrigeration compressor. From the standpoint of space and cost, which it will be appreciated must be minimized in a transportation system, it would be desirable to be able to employ the electrical power generator, which must be used to supply electric power during the operation of the refrigeration system when the vehicle is in motion, as an electric motor to supply mechanical power to drive the compressor when the vehicle is at a standstill.

The use of an induction generator which can be converted to an electric motor when desired for the purpose of supplying power to the refrigeration system is a satisfactory solution to the problems encountered in transportation refrigeration. However, induction generators, as will be appreciated by those familiar with the art, in the past have required rather large size capacitors which were heavy, bulky and expensive and their use in such a system was consequently restricted. Furthermore, the size of the capacitors which should be employed in an induction generator system must be varied depending upon the speed of operation of the generator if the system is to work satisfactorily. In practice, it is both necessary and desirable that the mechanical power source be permitted to operate at different speeds either because of its proportional relationship to the speed of the vehicle or because, where an auxiliary internal combustion engine is employed, a great saving in fuel consumed and reduction in engine wear may be effected by operating the motor at a low speed when full refrigeration capacity is not required. Low speed operation also has the advantage of reducing dehydration of the cargo by operation of the evaporator at a temperature closer to that of the storage space thereby condensing less moisture from the air in the cargo space.

Accordingly, it is an object of this invention to provide an improved power generation apparatus of the type described which enables the elimination of a separate electrical motor for standby operation by the conversion of the electric power generation equipment for use as an electric motor when required.

It is a further object of this invention to provide an improved induction generator which employs capacitors of relatively small size to that which ordinarily would be required with a consequent saving in space, cost and weight.

It is a further object of this invention to provide an improved induction generator which is adapted to be used at a plurality of speeds for supplying power to electrical controls and motors such as may be employed in a refrigeration system.

It is a further object of this invention to provide an improved induction generator having associated circuitry for increasing the excitation capacitance available during starting or slow speed operation of the generator.

It is a further object of this invention to provide an improved method of operating an induction generator.

It is a further object of this invention to provide an improved induction generator which is enabled to provide a plurality of output voltages depending upon the particular requirements of the system with which it is used.

These and other objects of this invention may be achieved by providing one or more banks of capacitors which are adapted to be selectively connected with the armature winding of a polyphase induction generator depending upon the speed or electrical output of the generator or the conditions of operation of the associated circuitry. An induction generator according to this invention may have a stationary armature winding with a plurality of voltage taps on the various phase windings for the provision of the desired output voltage to the generator load or for adjusting the voltage applied to the capacitors, which adjustment will vary the output voltage. The capacitor banks may be attached to the high voltage taps of the generator armature winding or to separate high voltage phase winding element so that a relatively small capacitance will provide sufficient excitation for the generator because the capacitance required is in inverse proportion to the square of the capacitor voltage. Various switches which are responsive to a condition of the system's operation may be used to automatically connect or disconnect capacitor banks from the generator armature winding depending upon the requirements of the system at a given time.

The preferred manner of carrying out this invention will become apparent by reference to the attached specification and drawings wherein.

Figure 1:
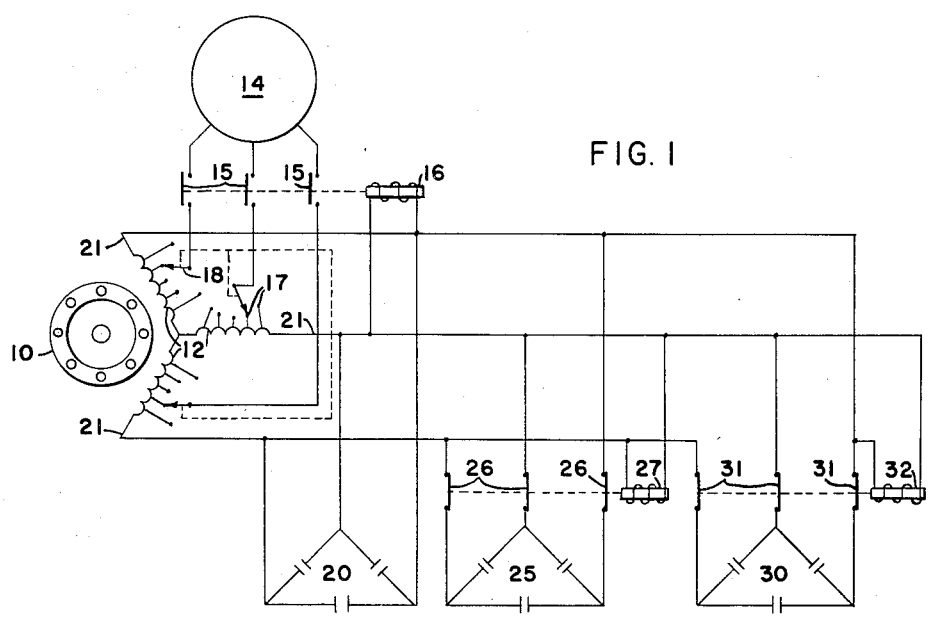
FIGURE 1 shows a generator system according to the instant invention employing separate excitation, load-starting, and low-speed running capacitor banks.

Referring first to FIGURE 1, there is shown an induction generator, which could comprise a dynamo, having a rotor member 10. Rotor 10, desirably may carry the generator field winding which may take the form of a squirrel cage winding. The induction generator has an armature winding which in the illustrated embodiment, may be a three-phase winding 12 on the stator member of the dynamo. Phase winding 12 may have a first or high voltage output at a high voltage tap 21 and a number of taps at intermediate voltage points as schematically illustrated at 17 to provide second or low voltage output. The proper tap 17 may be selected by a switch 18 depending upon the voltage requirements of load 14. If the induction generator of the instant invention is employed in a refrigeration system, it will be appreciated that load 14 may comprise the electrical circuitry associated with the refrigeration controls including an in-phase component and a highly inductive component due to the relatively large fan motors which are generally employed to move air across the refrigeration condenser and evaporator.

In order that a heavy load is not imposed on the generator during startup, load 14 is connected to tap 17 through switch contacts 15 which are normally open and actuated by switch actuation element 16 which is shown as being a relay coil connected across the output of the induction generator. Switch actuation element 16 in the application shown, is a voltage sensitive coil but it will be understood that it could be a current sensitive coil connected in series with one of the leads from armature windings 12 or could be a mechanical actuator such as a centrifugal switch associated with the shaft of rotor 10 or of the shafts of motors that are part of load 14. The important feature of switch actuation element 16 is that it be responsive to a condition of operation of the generator system; whether that condition be voltage or current output or speed of rotation of generator or load is generally immaterial.

A first bank of excitation capacitors 20 may be permanently connected to high voltage taps 21 of armature windings 12 to provide excitation for the generator and power factor correction for the load under normal high output, high-speed running conditions. A second or supplementary bank of load-starting capacitors 25 is removably connected by means of switch contacts 26 to the high voltage taps 21 of generator armature windings 12. Switch contacts 26 in the embodiment shown are normally closed and are responsive to switch actuation element 27 connected to two of the generator output voltage taps. It will, of course, be understood that switch actuation element 27 may be a voltage or current sensitive relay coil or may be otherwise responsive to an appropriate electrical or mechanical condition of the system.

A third or low-speed running bank of capacitors is removably connected to armature windings 12 of the induction generator by means of normally closed switch contacts 31. Switch contacts 31 are actuated by switch actuation element 32 which, as in the preceding switch actuating elements, may be a voltage or current sensitive solenoid or a mechanical switch actuator responsive to a condition of operation of the system. Each of the capacitor banks comprises a number of capacitors equal to the number of generator phases as shown in the drawing.

In operation, the generator shown in FIGURE 1 is rotated by a prime mover (not shown). Since switch contacts 26 and 31 are all normally closed, starting capacitor bank 25 and low-speed capacitor bank 30 are both connected to the generator high voltage tap 21 as is excitation capacitor bank 20.

As the speed of the generator builds up, its voltage output or speed increases to a point where switch actuation element 16 closes contacts 15, which connects load 14 to the appropriate predetermined voltage tap on generator armature winding 12. The motors which are a part of load 14 then start and accelerate, and the generator voltage continues to rise. When the voltage of the induction generator or the speed of the motors has built up to a sufficient value, switch actuation elements 27 and 32 cause switches 26 and 31, respectively, to open thus removing capacitor banks 25 and 30 from the generator.

The system then continues to operate in the high-speed condition with only excitation and power factor correction capacitor bank 20 connected in the circuit.

When the generator output voltage decreases, either due to low speed operation of rotor 10 or because of heavy loading of the generator, and is no longer sufficient to energize switch actuation element 32 to maintain switch contacts 31 open, the low-speed running supplemental capaictor bank 30 will be recommended to the generator armature. This will provide the additional excitation for the generator required for operation at low speeds or heavy loads. If the generator is completely stopped, switch actuation element 27 will be deenergized and switch contacts 26 will close thereby connecting supplemental starting capacitor bank 25 to armature winding 12 as previously described. It will be understood, therefore, that it is desirable that switch actuation element 32 operate at a higher generator output voltage than switch actuation element 27 but at a lower voltage than the normal high speed running voltage output of the generator at taps 21. Switch actuation element 16 should cause load 14 to be connected to the generator at a voltage just below the anticipated or predetermined low-speed running condition of the generator so that the generator is given an opportunity to develop voltage and speed before the load is connected to it.

Capacitor bank 30 may be omitted in this embodiment and capacitor bank 25 employed to serve the dual functions of starting and low speed running supplemental capacitance if desired.

Figure 2:
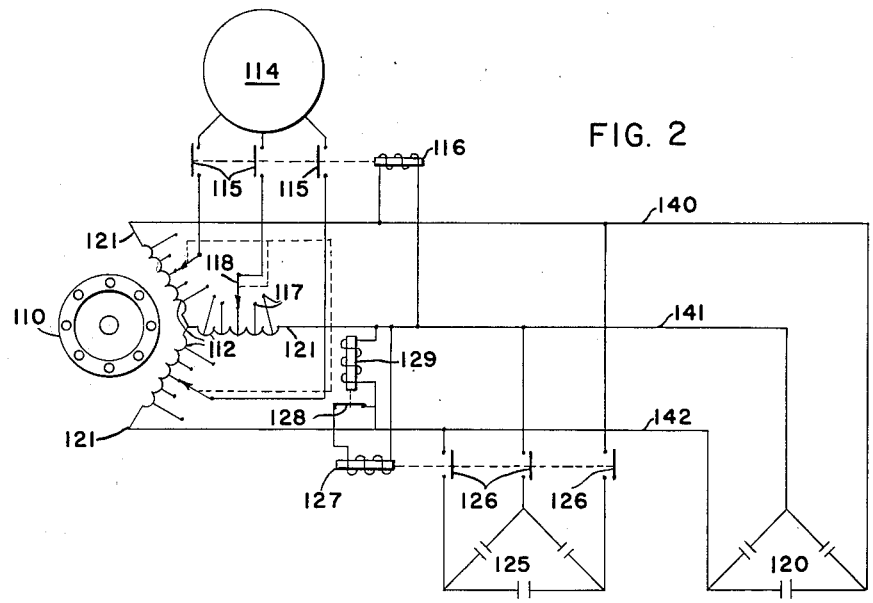
FIGURE 2 shows a modified generator system employing a single capacitor bank which combines the functions of starting and low-speed capacitors and a separate excitation capacitor bank.

Referring now to FIGURE 2, there is shown a polyphase induction generator having a rotor 110 which carries the generator field winding and stationary armature winding 112 having taps schematically illustrated at 117 selectable by switch 118 with a high voltage tap 121 similar to that described in the preceding embodiment to provide a first high voltage and a second low voltage output. It will be understood that in this and other embodiments of the invention illustrated, the field member has been illustrated as a rotating member as is customary in the design of induction generators. However, it is possible and within the scope of this invention to construct a generator of the induction type having a stationary field winding and a rotating armature but such generator would have the inherent disadvantage of requiring slip-rings or other means of taking the voltage off the rotating armature member.

As in the preceding embodiment, a load 114, which may have a substantial inductive component due to refrigeration fan motors if the generator system is used in the refrigeration field, is connected to taps 117 through normally open switch contacts 115 which are operated by switch actuation element 116 in the form of a voltage relay which functions to unload the generator at low speeds and to connect the load when the generator voltage is approaching a normal running condition. This unloading is not absolutely essential but it assures more positive operation of the generator upon initially starting up. A bank of excitation capacitors 120 may be permanently connected to the high voltage tap 121 of armature phase windings 112 to provide excitation for the generator and power factor correction for the load at normal high-speed running conditions.

As previously explained, by operating the capacitors at a high voltage, sufficient excitation of the generator is achieved with capacitors which are relatively small in size, weight, and cost compared to those which otherwise would be required if they were operated at the same voltage as that supplied to the load. However, it will be understood that although it may be desirable for tap 117 to provide a lower voltage to load 114 than that supplied to the capacitors, the load voltage could be taken from tap 121 either by moving the adjustable arm on switch 118 up to the high voltage tap 121 or the taps 117 could be entirely eliminated and the lower switch contacts 115 connected to the high voltage taps 121.

In this and the preceding embodiment, tap 117 may represent one of a plurality of taps at varying voltages along the armature winding or tap 117 may represent the junction of two armature windings which can be connected by a suitable switch in series for operation as a generator or in parallel for operation as a motor for driving a refrigeration compressor when the vehicle is standing. Likewise, tap 117 may be selectable by a switch 118 where a plurality of taps are employed, so as to enable selection of a desired output voltage for the particular load imposed on the system or selection of the voltage applied to the capacitor banks.

In the modification of FIGURE 2, it will be seen that only two banks of capacitors are employed and that the second or supplemental capacitor bank 125, which is connected to the high voltage taps 121 of armature 112 through switch contacts 126, serves the dual function of providing additional excitation for the generator for both load-starting and low-speed operation. In this modification, switch contacts 126 are normally open which permits the use of more readily available standard relays. Switch actuation element 127 of any desired type, which in the illustrated embodiment may be the coil of a relay, is shown to be a voltage sensitive element connected across the generator output through and in series with normally closed switch contacts 128 of a switch actuation element 129 of any desired type. The coil of a voltage relay is shown in the illustrated embodiment at 129 connected directly across the generator output. In operation, when the generator voltage begins to build up, element 127 closes contacts 126 connecting supplemental capacitor bank 125 to the armature winding 112. When the generator voltage reaches a certain predetermined value, element 129 will open contacts 128 thereby deenergizing coil 127 and opening contacts 126 and thus disconnecting supplemental capacitor bank 125 from the generator. When the voltage output of the generator decreases below a certain value, which may happen during starting of the motor comprising part of the load or while the generator is being brought down to a lower speed, element 129 will close contacts 128. These contacts energize coil 127, which closes contacts 126 and reconnects supplemental capacitor bank 125 to the generator. It can be seen therefore, that the capacitor bank 125 is connected to the generator output both during starting and low-speed running conditions thereby eliminating the necessity for a third bank of capacitors in cases where the excitation capacitance necessary for low-speed running approaches the same order of magnitude as that which should be employed during starting. Relay 129 may be omitted if normally closed contacts are provided at 126 as in the preceding embodiment of FIGURE 1.

It will also be appreciated that by connecting the generator load to a tap on at least a pair of the phase windings 117 and then selecting the proper predetermined tap 117 to which to connect the capacitor banks, the voltage output of the generator may be varied to suit the requirements of the load. By this means the generator is enabled to supply a number of selectable output voltages. For this purpose a switch (schematically illustrated at 118) or other means may be provided to select the desired taps for the load and capacitor banks. Obviously, it is not always necessary for the capacitors to operate at a higher voltage than is supplied to the load for this purpose, so a pair of selecting switches may be provided, one serving to select the desired load tap and the other to select the desired capacitor tap.

Figure 3:
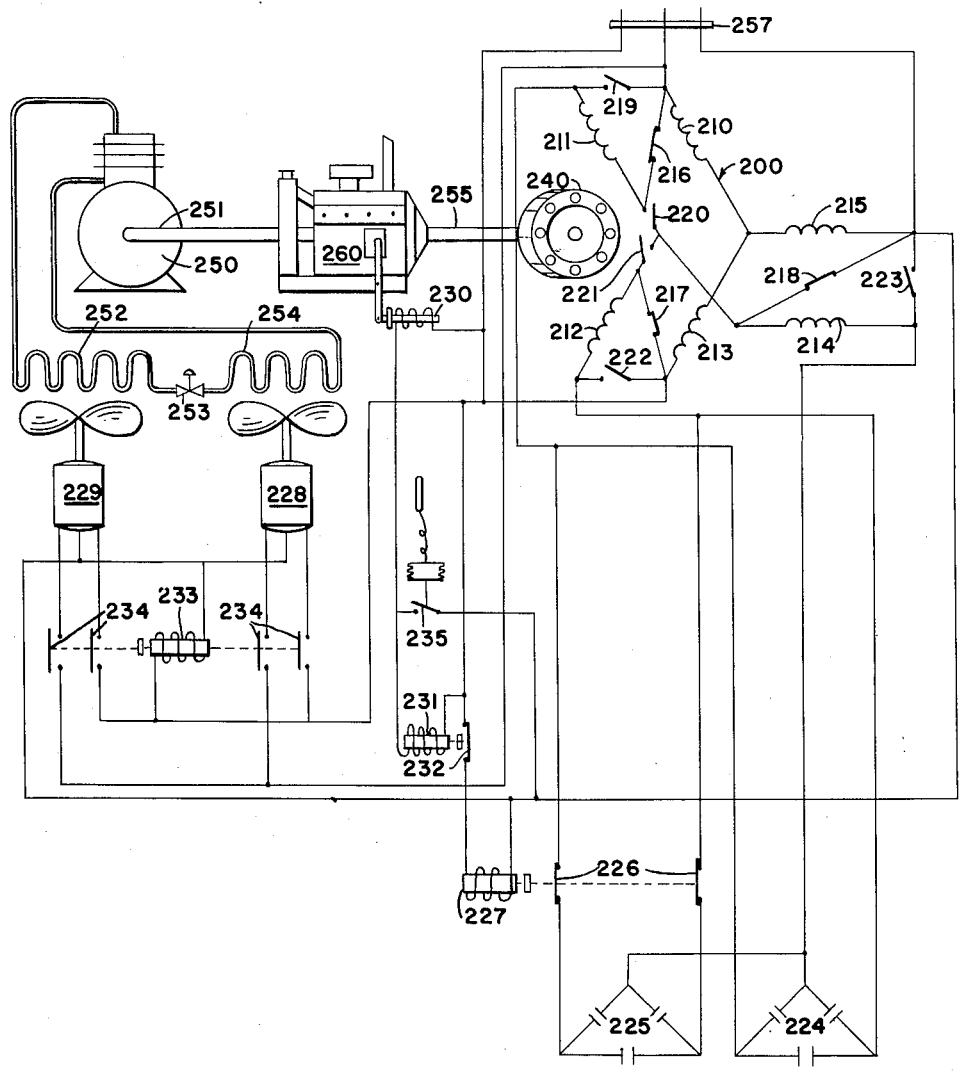
FIGURE 3 shows a combined motor and generator dynamo system together with associated circuitry for changing from motoring to generating.

Referring now to FIGURE 3, there is shown a combined motor and generator dynamo system, adapted for use with a transportation refrigeration vehicle, constructed in accordance with the principles of this invention. A dynamo 200 adapted to operate either as a motor or a generator has a rotor 240 secured to a shaft 255 and has a plurality of phase winding elements which are designated 210–215 comprising the armature winding. A five-pole double-throw control switch is provided to connect the phase winding elements for operation either as a three-phase generator or as a motor having a pair of parallel star-connected three-phase windings.

Switch contacts 216, 217 and 218 are closed in the "generator" position of the switch and open in the "motor" position thereof. Switch contacts 219–223, are open in the "generator" position of the switch and closed in the "motor" position. In the position shown in the drawings, the switch contacts connect pairs of the phase winding elements of the dynamo in series to form the phase windings of a three-phase induction generator. Any plural number of phases may be employed, three being selected for purposes of illustration. It will be seen that phase winding elements 210, 213 and 215 are connected together to a neutral point at one end and are connected to one end of phase winding elements 211, 212 and 214 respectively at their other ends.

When dynamo 200 is connected as a generator, first or excitation capacitor bank 224 is permanently connected to the remaining or high voltage ends of phase winding elements 211, 212 and 214 which causes the full generator output voltage to be applied to the capacitor bank 224. As in the preceding embodiment of FIGURE 2, a second or supplemental low-speed running capacitor bank 225, which also performs the function of providing additional starting capacitance in the generator circuit, is removably connected through switch contacts 226 to the first or high voltage output of the generator armature phase windings. Contacts 226 are normally closed in the embodiment shown in FIGURE 3 and may be opened by energization of switch actuation element 227 which may be a voltage sensitive coil of a relay connected at an appropriate point in the generator circuit to sense the output voltage of the generator so as to disconnect capacitor bank 225 when the generator output has reached a desired voltage. It will be understood that switch actuation element 227 may be a current sensitive relay coil connected in series with the generator load, a mechanical switch such as a centrifugal switch attached to a rotating shaft of the fan motors or elsewhere in the system or any other appropriate actuation means which is responsive to a condition of the system.

A load comprising evaporator fan motor 228 and condenser fan motor 229 for use with a transportation refrigeration system is connected through switch contacts 234 to the generator armature windings at the junction of each pair of series connected phase winding elements such as 210 and 211 which supplies a second or low voltage output and may be described as a low voltage tap. The fan motors may be of the polyphase type, as shown, or may be single-phase motors appropriately connected to two of the generator armature phase windings. Each of the phase winding elements 210 and 211 as well as the other pairs of phase winding elements which comprise the generator armature phase windings, are equal in number of turns so that the second voltage supplied to the load will be equal to substantially half the voltage which is supplied to capacitor banks 224 and 225. As has been pointed out before, the size of the capacitor banks which are necessary to provide sufficient excitation to an induction generator is inversely proportional to the square of the voltage applied to them. In the circuit described, therefore, capacitor banks 224 and 225 need have a capacitance which is only one fourth of the capacitance which would be required by a generator which could supply only the same voltage to the capacitor banks as is supplied to the generator load.

A refrigeration circuit is provided which is adapted for use with a railroad or other vehicle. The refrigeration circuit comprises a compressor 250, a condenser 252, an expansion device 253 such as an expansion valve, and an evaporator 254 located in heat exchange relation with a space in the vehicle to be conditioned. It will be understood that the illustration is merely schematic and that a complete system may comprise defrosting means, heating means and various electrical controls for the contemplated modes of operation of the refrigeration system which are not shown because they are unnecessary to the explanation of the present invention.

As also shown in the drawing of FIGURE 3, various single-phase controls for the refrigeration circuit are connected to the generator at two of the half voltage taps or points which comprise the junctions between the phase winding elements of the generator. Switch actuation element 227 is connected in series with normally closed switch contacts 232 across the load voltage output of the generator. A low speed relay having a coil 231 and normally closed contacts 232 is connected in parallel with a low-speed control element 230, which parallel combination is connected in series with thermostatic switch contacts 235 across the load voltage. In addition, relay coil 233 having contacts 234, which connects or disconnects fan motors 228 and 229 from the generator, is connected across the generator load voltage output.

In operation, the dynamo shaft 255, which is secured to rotor member 240 which carries the field winding of the generator which may conveniently be of the squirrel cage type, is mechanically connected to and cause to move by a prime mover 260 such as an internal combustion engine. Shaft 251 of compressor 250 is also mechanically connected to shaft 255. When the generator rotor is at rest and while the generator is reaching a predetermined desired operating speed, both permanently connected capacitor bank 224 and second or supplemental capacitor bank 225 are connected to the high voltage generator output. These capacitor banks effectively supply sufficient excitation to assure proper functioning and startup of the generator. As the generator voltage rises to a predetermined point (for example, about 170 volts) relay coil 233 connects fan motors 228 and 229 to the load voltage tap on the generator by closing contacts 234. As the generator voltage continues to rise, after a momentary decrease due to the sudden connection of the load to the armature winding, the voltage builds up to a second predetermined point (for example, 260 volts) which is sufficient to actuate relay coil 227 to open contacts 226 thereby disconnecting second capacitor bank 225 from the generator armature winding. In the example given, the generator output voltage may then drop to the predetermined output voltage which it is desired to supply to the load (for example, 240 volts).

The refrigeration compressor which in the illustrated embodiment may be adapted for use in a railway refrigeration system, is also operated by the prime mover 260. As the temperature of the refrigerated cargo space is brought down to within a few degrees of the desired operating temperature, thermostatic switch 235 will close and thereby actuate low speed relay coil 231 and low speed control 230. Low speed control 230 causes the speed of the generator to be reduced to a predetermined fraction of its higher operating speed, for example two-thirds. If the prime mover is an internal combustion engine, low speed control 230 may appropriately adjust the engine's carburetor to provide the lower speed operating condition for the generator and the refrigeration compressor. Closing of thermostatic switch 235 also energizes low-speed relay 231 which causes switch contacts 232 to open thereby de-energizing relay coil 227 and closing switch contacts 226. Closing of contacts 226 reconnects capacitor bank 225 to the high voltage output of the generator armature winding which provides the additional excitation which is necessary to sustain generator operation and proper output voltage at the lower speed operating condition.

When the control switch is actuated to the "motor" position, switch contacts 216, 217 and 218 open and switch contacts 219–223 close, which as can be seen from FIGURE 3, reconnect the phase winding elements of dynamo 200 in a manner to convert it to a three-phase parallel double-star connected motor. The phase winding elements may be connected to form a delta connected motor if desired. Pulg 257 is then connected to an adjacent source of available three-phase alternating current.

The alternating current source should supply a voltage, e.g., 220 volts, which is sufficient to operate evaporator fan motor 228 and condenser fan motor 229 as well as the associated controls of the refrigeration system. It is desirable to reconnect the phase winding element to form the phase windings of parallel connected double-star motor as shown in FIGURE 3, in order that the motor provide sufficient torque to operate the refrigeration compressor at 220 volts A.-C. in the example given. It will be noted that both capacitor banks 224 and 225 are connected in parallel with the motor and the evaporator fan motor and condenser fan motor under these conditions. The capacitor banks provide a significant improvement in the power factor of the motor system which is highly desirable particularly where a large number of refrigerator cars must draw sufficient current from the available power lines to maintain their refrigerated cargo space at a proper temperature. The available power lines are often heavily loaded in a railroad depot by a train load of refrigerator cars. and the improvement in power factor occasioned by the capacitor banks being connected to the electrical system assumes a significant importance.

It can be seen that by this invention a refrigeration system may be provided for a transportation refrigeration unit so that the refrigeration compressor and the electrical power generator is normally driven by a prime mover such as an internal combustion engine or a power takeoff on the vehicle axle. Under circumstances where the vehicle is not in operaiton, the generator which normally supplies electrical power to the refrigeration system may be reconnected to provide mechanical power to operate the compressor if the vehicle is standing adjacent a source of alternating current power. By this means, a considerable saving in fuel consumption and wear may be achieved when an internal combustion engine comprises the prime mover which normally drives the refrigeration system. In addition, noise and noxious exhaust fumes are eliminated because the refrigeration system is driven entirely by electrical power when the vehicle is standing and servicing of the engine is greatly facilitated.

It will also be understood that the embodiments herein described are merely illustrative of the preferred embodiments of this invention and that various combinations and subcombinations of the features herein described as well as modifications thereof may be employed without departing from the scope of this invention as defined in the following claims.

I claim:

1. In a transportation refrigeration system, a dynamo adapted for use both as a motor and a generator in said system, said system having a compressor, a condenser, an expansion device and an evaporator connected to form a refrigeration circuit and having electric fan motors associated with said evaporator and condenser, said refrigeration system being adapted for use to provide cooling of a vehicle compartment, said dynamo having a rotor mechanically connected to said compressor and to a mechanical power source and having a plurality of phase windings forming an armature winding thereof, each said phase winding comprising a pair of phase winding elements, means connecting each said pair of phase winding elements in series to form the phase windings of a polyphase induction generator, a voltage tap at the high voltage end of said phase windings, a second voltage tap between said phase winding elements providing a first and a second voltage output respectively, said first voltage being greater than said second voltage, means to connect electrically said fan motors to said second voltage output of said generator, a capacitor bank, means connecting said capacitor bank to said first voltage output of said generator to provide excitation for said generator, and means to reconnect said phase winding elements to form a parallel connected motor to drive said compressor when the vehicle is standing adjacent a source of alternating current power and said mechanical power source is shut off.

2. A dynamo as defined in claim 1 including a supplemental capacitor bank, means responsive to a condition of operation of said system to automatically connect said second capacitor bank to said first voltage output of said generator to provide additional excitation for said generator to assist in starting and maintaining the voltage of said system and to automatically disconnect said supplemental capacitor bank under conditions where said additional excitaiton is not desired, said means comprising a set of normally closed switch contacts so that said supplemental capacitor bank serves the additional function of improving the power factor of said system when said phase winding elements are reconnected to form a motor.

3. In an electrical power generation system comprising an induction generator having a field winding and an armature winding, a capacitor connected to said armature winding to supply excitation to said generator, and a generator load connected to said armature winding, the improvement comprising said armature being tapped, said capacitor being connected to said armature at a high voltage tap and said load being connected to said armature at a lower voltage tap whereby the use of smaller capacitors for excitation of said generator is enabled.

4. A system for the generation of electric power comprising an electric generator of the self excited induction type including a field winding and an armature winding, a plurality of voltage taps on said armature winding to provide at least two generator armature voltages, a generator load connected to a lower of said armature voltage taps, and a capacitor connected to a higher of said armature voltage taps to provide adequate excitation for the operation of said generator with relatively small values of capacitance.

5. A system for the generation of electric power of the type employing an electric generator of the self excited induction type comprising a field winding and an armature winding on said generator, a plurality of voltage taps on said armature winding, a capacitor adapted to provide excitation for operation of said generator, means for connecting a generator load to said armature winding, and switch means to selectively connect said capacitor to a desired one of said taps to excite said generator to the desired output voltage thereby providing a selectable output voltage to said load.

6. A system for the generation of electric power as defined in claim 5 wherein said load is connected to a lower voltage tap than the tap to which said capacitor is connected so as to provide the desired excitation and output voltage with a relatively small value of capacitance.

7. An electrical power generation system comprising an induction generator having an armature winding, a load connected to said armature winding, said armature winding being tapped so as to provide a plurality of voltage points thereon, a capacitor for exciting said generator, and means to selectively connect said capacitor to a desired voltage point on said generator armature winding thereby providing a selectable degree of excitation for said generator so that the output voltage supplied to said load from said generator armature winding may be suitably selected.

8. A power generation system as defined in claim 7 including switching means and wherein the armautre winding is connected to said switching means so as to operate said generator as an induction motor upon the connection of an available source of electric power thereto.

9. An electrical power generation system comprising an induction generator having an armature winding for providing an output voltage, means to connect a load to said generator armature winding, a capacitor for supplying self-excitation to said generator, selector means to provide one of a plurality of selectable voltages derived from said generator armature winding to said capacitor in order to correspondingly excite said generator to a selected degree and to thereby provide a selectable desired output voltage to said load.

References Cited in the file of this patent

UNITED STATES PATENTS

| | | |
|---|---|---|
| 2,066,123 | Re Qua | Dec. 29, 1936 |
| 2,871,439 | Shaw | Jan. 27, 1959 |
| 2,881,376 | Shaw | Apr. 7, 1959 |
| 2,907,182 | Kuklinski | Oct. 6, 1959 |

FOREIGN PATENTS

| | | |
|---|---|---|
| 827,631 | France | Apr. 29, 1938 |

UNITED STATES PATENT OFFICE
CERTIFICATE OF CORRECTION

Patent No. 3,043,115                  July 10, 1962

Earl F. Harter

It is hereby certified that error appears in the above numbered patent requiring correction and that the said Letters Patent should read as corrected below.

Column 3, line 4, after "provide" insert -- a --; line 48, for "remomvably" read -- removably --; column 4, line 9, for "capaictor bank 30 will be recommended" read -- capacitor bank 30 will be reconnected --; column 7, line 27, for "cause" read -- caused --; column 8, line 33, for "combusion" read -- combustion --.

Signed and sealed this 8th day of January 1963.

SEAL)
Attest:

ERNEST W. SWIDER
Attesting Officer

DAVID L. LADD
Commissioner of Patents